US012579363B2

(12) United States Patent
Duetting et al.

(10) Patent No.: US 12,579,363 B2
(45) Date of Patent: Mar. 17, 2026

(54) INCENTIVE AWARE-AGGREGATION OF GENERATIVE MODELS

(71) Applicant: Google LLC, Mountain View, CA (US)

(72) Inventors: Paul Duetting, Bern (CH); Seyed Vahab Mirrokni, Short Hills, NJ (US); Renato Purita Paes Leme, New York, NY (US); Song Zuo, Beijing (CN); Haifeng Xu, Chicago, IL (US)

(73) Assignee: Google LLC, Mountain View, CA (US)

( * ) Notice: Subject to any disclaimer, the term of this patent is extended or adjusted under 35 U.S.C. 154(b) by 179 days.

(21) Appl. No.: 18/621,684

(22) Filed: Mar. 29, 2024

(65) Prior Publication Data

US 2025/0307549 A1 Oct. 2, 2025

(51) Int. Cl.
*G06F 40/284* (2020.01)

(52) U.S. Cl.
CPC .................................. *G06F 40/284* (2020.01)

(58) Field of Classification Search
None
See application file for complete search history.

(56) References Cited

U.S. PATENT DOCUMENTS

| | | | |
|---|---|---|---|
| 9,858,586 B2 | 1/2018 | Little et al. | |
| 9,947,029 B2 | 4/2018 | Collette et al. | |
| 10,261,850 B2 | 4/2019 | Nicholas et al. | |
| 11,836,615 B2 | 12/2023 | Greenewald et al. | |

| | | | |
|---|---|---|---|
| 12,277,162 B1* | 4/2025 | Yates | .................... G06F 16/432 |
| 2021/0049627 A1 | 2/2021 | Romagnolo et al. | |
| 2022/0012767 A1 | 1/2022 | Leitersdorf et al. | |
| 2022/0147715 A1 | 5/2022 | Wang et al. | |
| 2024/0070439 A1* | 2/2024 | Segars | ................... G06N 3/094 |
| 2025/0140354 A1* | 5/2025 | Tadesse | ................. G06N 3/045 |

FOREIGN PATENT DOCUMENTS

| | | |
|---|---|---|
| WO | 2022101515 A1 | 5/2022 |

OTHER PUBLICATIONS

Deng et al., FAIR: Quality-Aware Federated Learning with Precise User Incentive and Model Aggregation, 2021 (Year: 2021).*
Atoniak, S., et al., "Mixture of Tokens: Efficient LLMs Through Cross-Example Aggregation", arXiv:2310.15961v1 [cs. CL] Oct. 24, 2023. pp. 1-11.
Harris, K., et al., "Algorithmic Persuasion Through Simulation", arXiv:2311.18138v2 [cs.GT] Feb. 13, 2024. 25 pages.

(Continued)

*Primary Examiner* — Nafiz E Hoque
(74) *Attorney, Agent, or Firm* — Lerner David LLP

(57) ABSTRACT

Aspects of the disclosure are directed to a token aggregator for aggregating outputs from various generative models. The token aggregator can operate on a token-by-token basis, serving to aggregate several weighted generative model outputs to generate a joint output. By providing weights to the token aggregator as to what the preferred distribution may be, the weights can be used to tradeoff between generative model outputs to help determine the relative weight of the generative model outputs for creating the joint output as well as determining contribution amounts, e.g., bid payments, credits, or points, from respective model outputs.

20 Claims, 5 Drawing Sheets

(56)　　　　References Cited

OTHER PUBLICATIONS

Feizi, S., et al., "Online Advertisements with LLMs: Opportunities and Challenges", arXiv:2311.07601v2 [cs.CY], Feb. 14, 2024. pp. 1-15.

Chen, J., et al., "Put Your Money Where Your Mouth Is: Evaluating Strategic Planning and Execution of LLM Agents in an Auction Arena", arXiv:2310.05746v1 [cs.CL] Oct. 9, 2023. pp. 1-24.

Park, J., et al. "Generative Agents: Interactive Simulacra of Human Behavior", arXiv:2304.03442v2 [cs.HC] Aug. 6, 2023. 22 pages.

Horton, J., "Large Language Models as Simulated Economic Agents: What Can We Learn from Homo Silicus?", arXiv:2301.07543v1 [econ.GN] Jan. 18, 2023. pp. 1-18.

Dutting, P., et al., "Optimal Auctions through Deep Learning: Advances in Differentiable Economics", arXiv:1706.03459v6 [cs.GT] Oct. 14, 2022. pp. 1-55.

Bai, Y., et al., "Training a Helpful and Harmless Assistant with Reinforcement Learning from Human Feedback", arXiv:2204.05862v1 [cs. CL] Apr. 12, 2022. pp. 1-74.

Bakker, M., et al., "Fine-tuning language models to find agreement among humans with diverse preferences", Advances in Neural Information Processing Systems 35, Dec. 2022. pp. 38176-38189.

Bergemann, D., et al., "Robust Mechanism Design", Econometrica, vol. 73, No. 6, Nov. 2005. pp. 1771-1813.

Brown, T., et al., "Language Models are Few-Shot Learners", Advances in neural information processing systems, vol. 33, 2020. pp. 1877-1901.

Dughmi, S., "A Truthful Randomized Mechanism for Combinatorial Public Projects via Convex Optimization", arXiv:1103.0041v2 [cs.GT] Apr. 16, 2011. 21 pages.

Edelman, B., et al., "Internet Advertising and the Generalized Second Price Auction: Selling Billions of Dollars Worth of Keywords", American Economic Review, vol. 97.1, Mar. 2007. pp. 242-259.

Google, et al., PaLM 2 Technical Report, arXiv:2305.10403v3 [cs.CL] Sep. 13, 2023. pp. 1-93.

Myerson, R., "Optimal Auction Design", Mathematics of Operations Research, vol. 6, No. 1, Feb. 1981. 17 Pages.

Bulow, J., et al., "The Simple Ecomonics of Optimal Auctions", Journal of Political Economy, vol. 97, No. 5, Oct. 1989. pp. 1060-1090.

Carroll, G., "Robustness and Linear Contracts", American Economic Review, Feb. 2015. pp. 536-563.

Ouyang, L., et al., "Training language models to follow instructions with human feedback", Advances in Neural Information Processing Systems, Dec. 2022. 15 pages.

Papadimitriou, C., et al., "On the Hardness of Being Truthful", 2008 49th Annual IEEE Symposium on Foundations of Computer Science, Oct. 2008. 10 pages.

Ramesh, A., et al., "Zero-Shot Text-to-Image Generation", International Conference on Machine Learning, PMLR, Jul. 2021. 11 pages.

Roughgarden, T., et al., "Optimal and Robust Mechanism Design with Interdependent Values", ACM Transactions on Economics and Computation, vol. 4, No. 3, Article 18, Jun. 2016. 34 pages.

Schulman, J., et al., "Proximal Policy Optimization Algorithms", arXiv:1707.06347v2 [cs.LG] Aug. 28, 2017. pp. 1-12.

Sun, C., et al., "VideoBERT: A Joint Model for Video and Language Representation Learning", Proceedings of the IEEE/CVF international conference on computer vision, Apr. 2019. pp. 7464-7473.

Thoppilan, R., et al., "LaMDA: Language Models for Dialog Applications", arXiv:2201.08239v3 [cs. CL] Feb. 10, 2022. pp. 1-47.

Varian, H., "Position auctions", International Journal of Industrial Organization, Dec. 2007. pp. 1163-1178.

Vickrey, W., "Counterspeculation, Auctions, and Competitive Sealed Tenders", The Journal of Finance, vol. 16, No. 1, Mar. 1961. pp. 8-37.

Wei, J., et al., "Finetuned Language Models are Zero-Shot Learners", arXiv:2109.01652v5 [cs. CL] Feb. 8, 2022. pp. 1-46.

Wei, J., et al., "Chain-of-Thought Prompting Elicits Reasoning in Large Language Models", Advances in Neural Information Processing Systems, Dec. 2022. pp. 1-14.

Wei, J., et al., "Larger Language Models Do In-Context Learning Differently", arXiv:2303.03846v2 [cs.CL] Mar. 8, 2023. pp. 1-51.

Wu, N., et al., "Large Language Models are Diverse Role-Players for Summarization Evaluation", arXiv:2303.15078v3 [cs.CL] Sep. 19, 2023, pp. 1-12.

Yu, J., et al., "Scaling Autoregressive Models for Content-Rich Text-to-Image Generation", arXiv:2206.10789v1 [cs.CV] Jun. 22, 2022. pp. 1-49.

* cited by examiner

INCENTIVE AWARE-AGGREGATION OF GENERATIVE MODELS

BACKGROUND

In the current web ecosystem, auctions are the primary mechanism used to decide which digital content is displayed to users. These auctions can be utilized to influence the output of generative models, such as large language models. For example, a particular web space can be marked for various digital content providers to bid to influence the content in that space. Each digital content provider can have their own generative model to generate content for the web space. Each digital content provider is also willing to pay a certain amount for the right to have their generated content displayed in the web space. While the auction can simply collect the bids from each digital content provider and let the highest bidder choose the content they wish to publish in the web space, this does not account for the flexibility of generative models to combine different digital content concepts within the same web space. This can result in increased memory usage and processing as additional web space would be needed to cover the various concepts from each digital content provider.

BRIEF SUMMARY

Aspects of the disclosure are directed to a token aggregator for aggregating outputs from various generative models. Tokens are units that form sentences and paragraphs. Examples of tokens include words, symbols, numbers, and special tokens, such as tokens indicating the beginning and ending of text. In particular, any piece of text can be represented as an array of tokens, and any array of tokens can also encode a piece of text. Generative models can be stateless, maintaining no internal memory or state. Instead, stateless generative models map a prefix string to a distribution over the next token. Given an input prompt, generative models generate an output by repeatedly being fed a current sequence of tokens, sampling a continuation token, and appending the sampled token to the sequence of tokens. The token aggregator can operate on a token-by-token basis, configured to aggregate several weighted generative model outputs to generate a joint output. This can allow for a reduction in memory usage, at least in part based on the generative models being stateless.

There is considerable difficulty in meaningfully manipulating the distribution over tokens at any given stage to account for preferences in the joint output. However, by providing weights to the token aggregator as to what the preferred distribution may be, additional inputs can be used to tradeoff between generative model outputs to help determine the relative weight of the generative model outputs for creating the joint output and for determining contribution amounts from respective model outputs. This can allow for reducing memory usage and processing, as less web space would be needed for the joint outputs.

For example, in the digital content domain, two different large language models may produce respective digital content for a resort called Stingray Resort and an airline called Maui Airlines. The resort content may be "Experience the magic of Hawaii at Stingray Resort, where stunning views, luxurious accommodations, and endless activities await. Book your stay today and create unforgettable memories in the heart of paradise." The airline content may be "Fly to Hawaii with Maui Airlines and experience the beauty of the Aloha State. We offer affordable flights to all the major islands, so you can start your Hawaiian vacation sooner. Book your flight today and let the island spirit take over!" The token aggregator may receive and process both digital content, along with respective bids for each digital content, to generate joint digital content that accounts for both the resort and airline. The joint content may be "Fly to paradise with Maui Airlines and experience the magic of Hawaii at Stingray Resort. Stunning views, luxurious accommodations, and endless activities await. Book your dream vacation today and create unforgettable memories." The token aggregator can further determine a contribution amount for the resort content and airline content within the joint content that can correspond to a bid percentage the resort and airline can respectively pay for the joint content. The contribution amount can also correspond to other forms like credits or points.

An aspect of the disclosure provides for a method for aggregating generative model outputs on a token-by-token basis, including: receiving, by one or more processors, a plurality of model outputs and corresponding weight inputs; aggregating, by the one or more processors, the plurality of model outputs into an aggregated output based on the weight inputs; mapping, by the one or more processors, the aggregated output into a distribution over a plurality of tokens; sampling, by the one or more processors, a token from the distribution; appending, by the one or more processors, the token to a sequence of tokens that form an aggregated model output; computing, by the one or more processors, a contribution of each model output in the aggregated model output based on the sequence of tokens that form the aggregated model output; and outputting, by the one or more processors, the aggregated model output and the contribution of each model output in the aggregated model output.

Another aspect of the disclosure provides for a system including: one or more processors; and one or more storage devices coupled to the one or more processors and storing instructions that, when executed by the one or more processors, cause the one or more processors to perform operations for the method of aggregating generative model outputs on a token-by-token basis. Yet another aspect of the disclosure provides for a non-transitory computer readable medium for storing instructions that, when executed by the one or more processors, cause the one or more processors to perform operations for the method of aggregating generative model outputs on a token-by-token basis.

In an example, the method further includes iteratively performing the sampling and appending to form the aggregated model output. In another example, the method further includes: receiving, by the one or more processors, a plurality of prompts; and processing, by the one or more processors, the prompts using respective generative models to generate the model outputs.

In yet another example, the generative models include at least one of large language models, large foundation models, or large graphical models. In yet another example, the plurality of model outputs includes a plurality of vectors.

In yet another example, aggregating the plurality of model outputs further includes performing linear aggregation. In yet another example, mapping the aggregated output into a distribution is according to one or more decoding hyperparameters. In yet another example, the contribution is based on threshold weight inputs that shift the contribution from a less preferred to a more preferred token.

DETAILED DESCRIPTION

Figure 1:
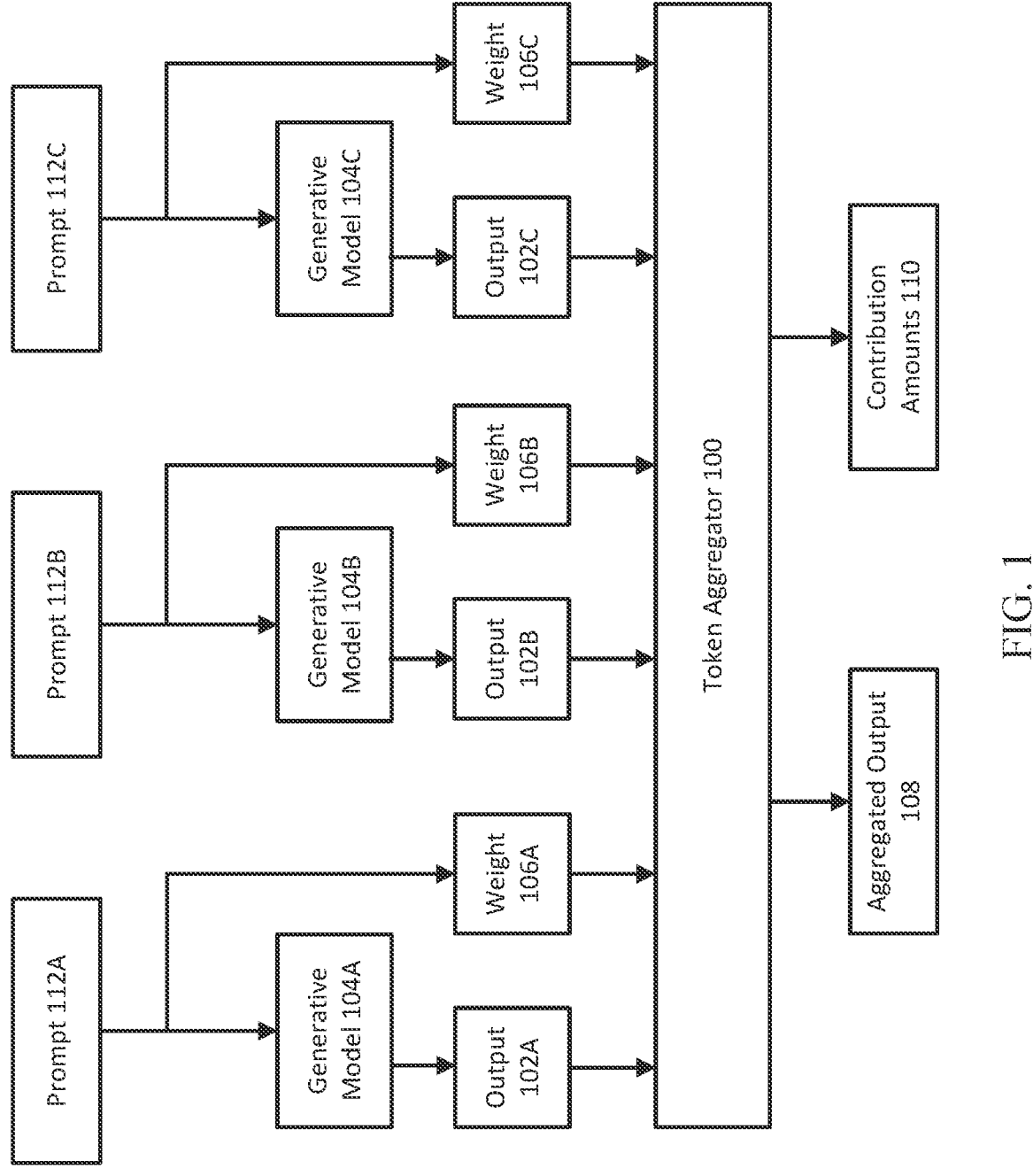
FIG. 1 depicts a block diagram of an example token aggregator according to aspects of the disclosure.

The technology generally relates to aggregating outputs from various generative models through a token aggregator. The token aggregator includes a vector aggregation function that aggregates the outputs on a token-by-token basis while allowing each output to be influenced in the aggregation via weight inputs. The token aggregator further includes a contribution function that determines how each output contributes to the aggregated output and generates a contribution amount based on the determination. The token aggregator allows for aggregating vector outputs by the generative models in an understandable, e.g., human readable, and incentive-compatible manner, resulting in less memory usage and processing requirements. For example, less data is required to be transmitted overall, when comparing the relative size of the individual outputs from the generative model, with the size of the aggregated output.

The token aggregator operates repeatedly for each generated token in a sequence of tokens to form the aggregated output. Each generative model receives a prompt, processes the prompt, and generates a model output. The model outputs can be vectors, as an example. Generative models can include large language models, large foundation models, and/or large graphical models, as examples, and can be general usage or trained or fine-tuned to a particular task. As a further example, large graphical models can include diffusion models. The token aggregator receives the model outputs along with corresponding weight inputs and aggregates the model outputs weighted by their weight inputs into an aggregated output. The weight inputs can be a single dimension, as an example. For example, the token aggregator can aggregate the vectors using linear aggregation. The token aggregator maps the aggregated output, e.g., aggregated vector q, into a distribution over a plurality of tokens based on one or more predetermined decoding hyperparameters. For example, the token aggregator can map the aggregated vector into a distribution according to greedy searching, top-K sampling, top-P sampling, and/or beam searching. The token aggregator then samples a token from the distribution and appends the token to a sequence of tokens. The token aggregator further computes a contribution of each model output based on the aggregated output and sampled token. The token aggregator can compute the contributions based on threshold weight inputs that allow for shifting the contribution from a less preferred to a more preferred token based on smaller deviations along the same direction. The token aggregator can repeat these steps for each token in the sequence of token to generate the aggregated model output.

As an example, the token aggregator can be utilized for digital content generation, e.g., advertisements. A plurality of generative models, each representing different digital content providers, can each output digital content in response to respective prompts to generate the digital content. For instance, a makeup brand and a clothing brand can each generate digital content for their brand using respective large language models. The token aggregator can receive the digital content from each generative model along with a bid for that digital content to be output, e.g., displayed as an advertisement. For instance, the makeup brand and clothing brand can each bid a payment amount to have their digital content displayed as an advertisement. The token aggregator can aggregate the digital content into consolidated digital content to be output based on the received digital content and bids. For instance, the token aggregator can combine the digital content from the makeup brand and clothing brand such that the consolidated digital content is displayed as an advertisement for both the makeup brand and clothing brand, e.g., a person in the advertisement is wearing makeup from the makeup brand and clothes from the clothing brand. The token aggregator can further determine how much each content provider should pay based on their bid and contribution amount in the consolidated digital content. For instance, the token aggregator can determine the makeup brand and clothing brand should respectively pay 30% and 70% of their bids to have their digital content output based on the representation of their brands in the consolidated digital content.

FIG. 1 depicts a block diagram of an example token aggregator 100. The token aggregator 100 can receive outputs 102, e.g., 102A-C, from generative models 104, e.g., 104A-C. The token aggregator 100 can also receive weights 106, e.g., 106A-C, corresponding to the outputs 102. For example, the weights 106 may be or correspond to bids sent along with the outputs 102. In some examples, the weights 106 are received separate from the outputs 102. While three outputs, generative models, and weights are shown in FIG. 1, the token aggregator 100 can receive any number of outputs from any number of generative models and can also receive any number of weights. The token aggregator 100 can process the outputs 102 and weights 106 to generate an aggregated output 108 as well as contribution amounts 110. The aggregated output 108 can be a combination of the outputs 102, where the amount a particular output 102 is included within the aggregated output 108 can be determined by the weight 106. The contribution amounts 110 can correspond to the amount each output 102 is included within the aggregated output 108. The contribution amounts 110 can be related to the weights 106 provided.

The generative models 104 can receive respective prompts 112, e.g., 112A-C, to generate the outputs 102. The prompts 112 can include instructions to generate content, such as digital content for display in a web space. The prompts 112 can further include the weights 106 to be processed by the generative models 104, or the weights 106 can be received by the token aggregator 100 separately. The generative models 104 can be large language models, large foundation models, and/or large graphical models, as examples, and can be general usage or fine-tuned to a particular task. The generative models 104 can be configured to process the prompts 112 to generate the outputs 102 to be received by the token aggregator 100. While shown separate from the token aggregator 100 in FIG. 1, the token aggregator 100 can also include the generative models 104. Here, the token aggregator 100 can receive the prompts 112 and/or weights 106 directly, rather than receiving the model outputs 102 and/or weights 106. The token aggregator 100 can process the prompts 112 using generative models 104 to generate the model outputs 102 and can aggregate the model outputs 102 based on the weights 106 to generate the aggregated output 108 and contribution amounts 110.

Figure 2:
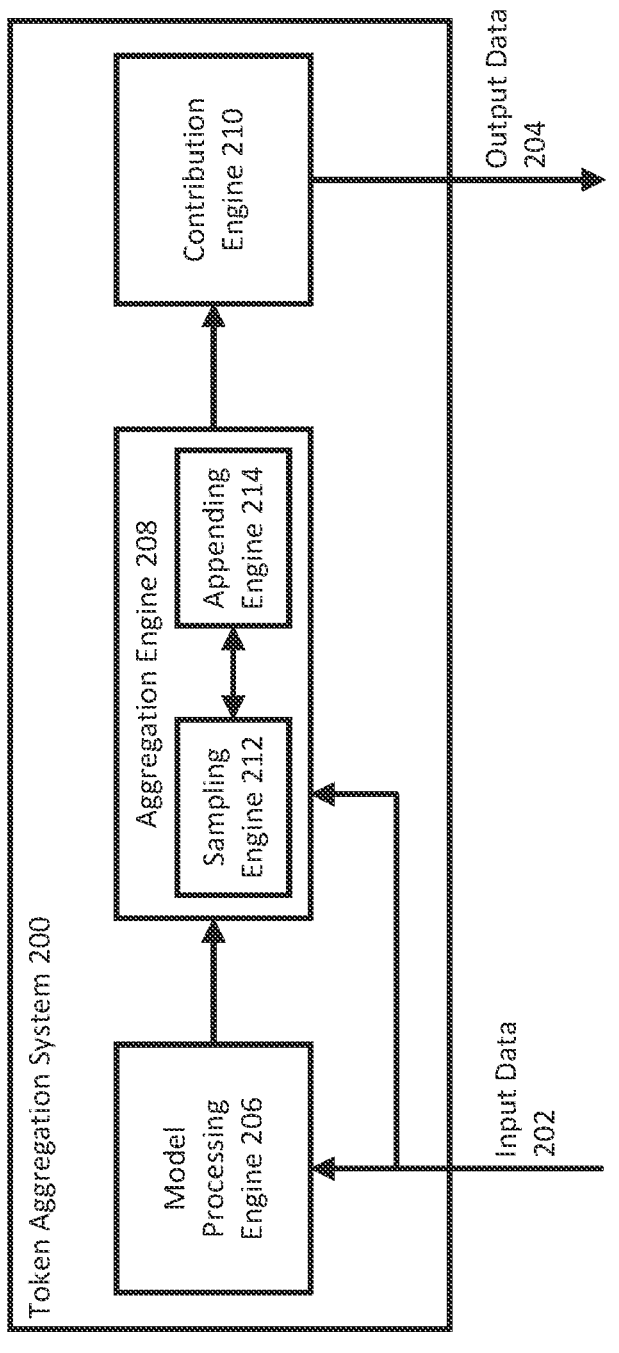
FIG. 2 depicts a block diagram of an example token aggregator system according to aspects of the disclosure.

FIG. 2 depicts a block diagram of a token aggregation system 200 for aggregating model outputs and determining contribution amounts. The token aggregation system 200 can be implemented on one or more computing devices in one or more locations.

The token aggregation system 200 can be configured to receive input data 202. For example, the token aggregation system 200 can receive the input data 202 as part of a call to an application programming interface (API) exposing the token aggregation system 200 to one or more computing devices. The input data 202 can also be provided to the token aggregation system 200 through a storage medium, such as remote storage connected to the one or more computing devices over a network. The input data 202 can further be provided as input through a user interface on a client computing device coupled to the token aggregation system 200.

The input data 202 can include a plurality of model-generated outputs and respective weights corresponding to the model-generated outputs. For example, the model-generated outputs can be digital content for display in a web space and the weights can be bids to have the digital content selected for display in the web space. Alternatively, or additionally, the input data 202 can include a plurality of prompts. The prompts can include instructions for respective generative models to generate outputs and weights for aggregation, or the prompts can include instructions for respective generative models to generate outputs, where the instructions provide the weights. For example, the prompts can include instructions for respective large language models to generate digital content and bids for the digital content to be displayed in a web space.

From the input data 202, the token aggregation system 200 can be configured to output one or more results generated as output data 204. The output data 204 can include an aggregated output and contribution amounts based on the aggregated output. For example, the aggregated output can be digital content that combines model-generated digital content based on bids for display in a web space. The contribution amounts can be the bids adjusted based on how the model-generated digital content is integrated into the combined digital content for display in the web space.

As an example, the token aggregation system 200 can be configured to send the output data 204 for display on a client or user display. As another example, the token aggregation system 200 can be configured to provide the output data 204 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The token aggregation system 200 can further be configured to forward the output data 204 to one or more other devices configured for translating the output data for display or into an executable program written in a computer programming language. The token aggregation system 200 can also be configured to send the output data 204 to a storage device for storage and later retrieval.

The token aggregation system 200 can include a model processing engine 206, an aggregation engine 208, and a contribution engine 210. The model processing engine 206, aggregation engine 208, and contribution engine 210 can be implemented as one or more computer programs, specially configured electronic circuitry, or any combination thereof. The aggregation engine 200 may receive model-generated outputs and weights as input data 202 or from the model processing engine 206. If from the model processing engine 206, then the model processing engine 206 may receive prompts as input data 202 to generate the outputs and/or weights for the aggregation engine 208.

The model processing engine 206 can be configured to process the prompts using respective generative models to generate the outputs and/or weights. For example, the generative models can be large language models corresponding to functions that map from a prefix string, such as a partial sentence, to a distribution of the next token that extends the partial sentence. Let T be the set of all possible tokens and $\Delta(T)$ be the set of distributions over T. Let $T^*=T\cup T^2\cup \ldots \cup T^K$ denote the set of sequences of tokens of length at most K, where K is the maximum sequence length that the large language model can handle, and $\cup$ is the operation for a union of sets. Each large language model can correspond to a function $f: T^*\rightarrow\Delta(T)$ that maps any sequence of tokens to a distribution over the next token.

A prompt can be an initial set, e.g., vector or array, of tokens $s_0$. $s_0$ can be an element of the set of sequences of token $T^*$, e.g., $s_0\in T^*$, and is provided with instructions of what to generate, where $\in$ indicates that $s_0$ is a member of the set $T^*$. For example, a large language model can produce a text in response to the prompt by sampling a token $\tau_1$ for example by performing $(\tau_1\sim f(s_0))$, where $\sim$ is the operation for sampling from a distribution and constructing an updated set, e.g., vector or array, of tokens $s_1$, for example as $s_1=s_0\oplus\tau_1$, where $\oplus$ is the operation to append a token to an array. This process of sampling a token and appending the token to the array can be repeated until an end-of-sentence token is sampled. If the sequence of tokens becomes larger than K, then the sequence $s_{k+1}$ can be trimmed to its length-K suffix. Generative models can be stateless, keeping no internal memory other than the sequence of tokens generated so far and sampling each token independently.

The aggregation engine 208 can be configured to combine the outputs, such as from the model processing engine 206, based on the weights, to generate an aggregated output. The aggregation engine 208 can combine the outputs on a token-by-token basis. For example, the aggregation engine 208 can allow for n generative models to influence the output distribution and contributions through scalar weights. For example, the vector of weights can be a vector of positive real values, for example denoted by $b=(b_1, \ldots, b_n)\in R_+^n$. The aggregation engine 208 can include a distribution aggregation function q that takes as input the vector of weights b and n distributions $p\in\Delta(T)^n$ and maps the vector of weights and the distributions to a distribution over tokens. For example, the aggregation function can be q: $R_+^n\times\Delta(T)^n\rightarrow\Delta(T)$. The aggregation engine 208 can start from the initial prompt $s_0\in T^*$, repeatedly sample $\tau_x$ from the distribution $q_k=q((b_1, \ldots, b_n), (f_1(s_{k-1}), \ldots, f_n(s_{k-1})))$ for each $k\geq1$ to generate the sequence $s_k=s_{k-1}\oplus\tau_k$. Since the model processing engine 206 already can produce distributions $f_i(s_{k-1})$, where i may be a natural number up to n, e.g., $i\in[n]$, no additional prompts for the generative models are needed. The aggregation engine 208 can further include a sampling engine 212 and appending engine 214 for iteratively sampling and appending tokens to a sequence of tokens that form the combined output.

The contribution engine 210 can be configured to determine contribution amounts for each output in the aggregated output. The contribution engine 210 can include a contribution function operating on a token-by-token basis. For example, the contribution function can be $\zeta_i$: $R_+^n \times \Delta(T)^n \times T \rightarrow R$. For weights $b \in R_+^n$, distributions $p \in \Delta(T)^n$, and token $t \sim q(b,p)$, the contribution from a generative model i is $\zeta_i(b,p,t)$. The contribution engine 210 can determine the contributions based on the weights that shift the contribution from a less preferred to a more preferred token based on distributions with lower deviations along the same direction.

It is generally difficult to compare preferences among distributions. For example, given a preferred distribution over two tokens $p=(0.6,0.4)$ and two generated distribution outcomes are $q_1=(0.5,0.5)$ and $q_2=(0.8,0.2)$, it is unclear which of the two generated distributions would be preferred. While $q_2$ appears more distant from p than $q_1$, it has a higher probability on the first token. However, given a third generated distribution outcome $q_3=(0.7,0.3)$, $q_2$ would be preferred over $q_3$ because $q_3$ deviates from p along the same directions as $q_2$, e.g., the entries both increase or both decrease, for each entry but deviates less in terms of the absolute value of deviation. As such, the contribution engine 210 can calculate preferences that determine contribution amounts based on partial orders over the distributions. For example, a distribution q can be preferred by a generative model over another distribution q' when the deviation of q from p is smaller than the deviation of q' from p for each entry and these deviations are along the same direction for each entry.

Figure 3:
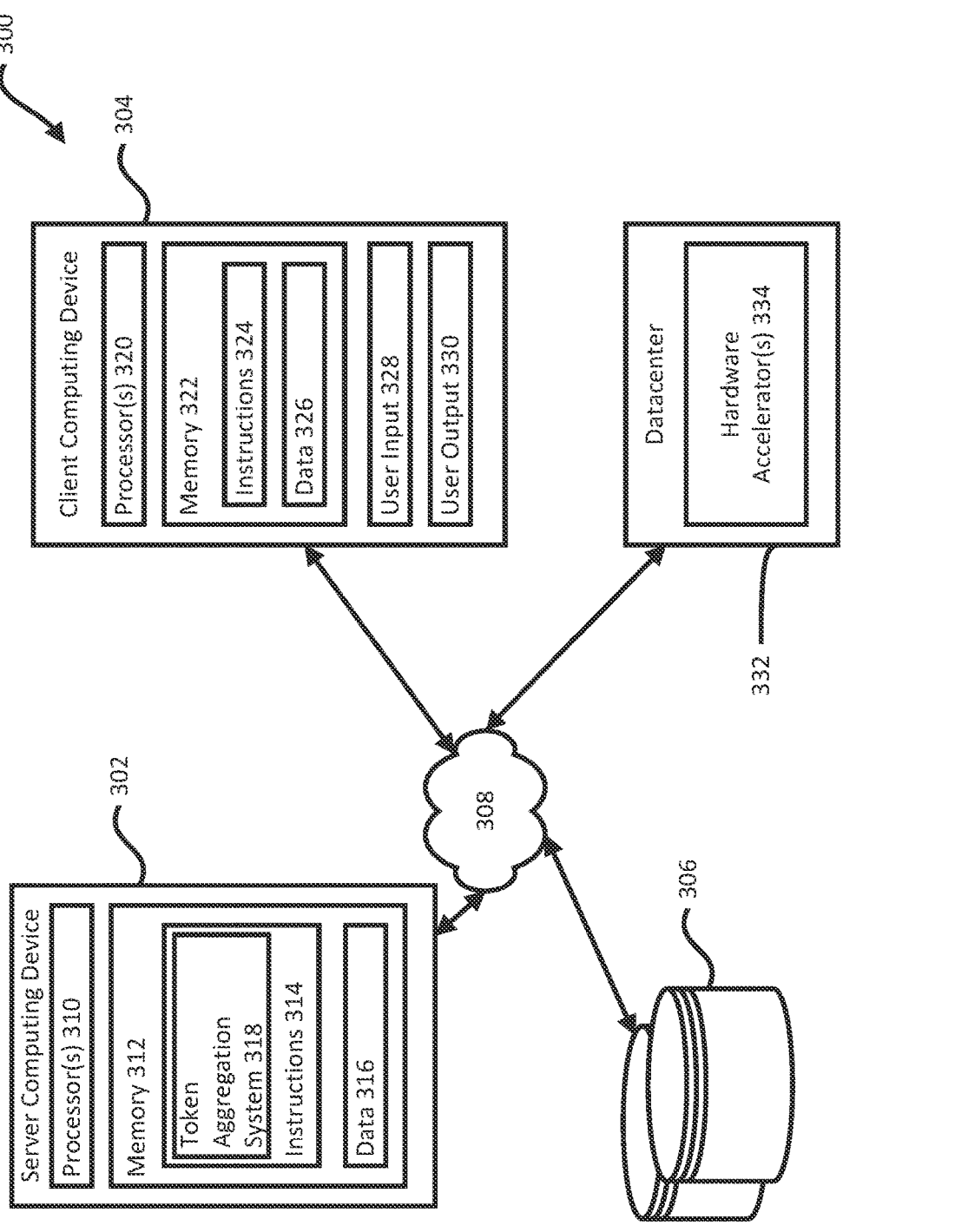
FIG. 3 depicts a block diagram of an example environment for implementing a token aggregator system according to aspects of the disclosure.

FIG. 3 depicts a block diagram of an example environment 300 for implementing a token aggregation system 318. The token aggregation system 318 can be implemented on one or more devices having one or more processors in one or more locations, such as in server computing device 302. Client computing device 304 and the server computing device 302 can be communicatively coupled to one or more storage devices 306 over a network 308. The storage devices 306 can be a combination of volatile and non-volatile memory and can be at the same or different physical locations than the computing devices 302, 304. For example, the storage devices 306 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 302 can include one or more processors 310 and memory 312. The memory 312 can store information accessible by the processors 310, including instructions 314 that can be executed by the processors 310. The memory 312 can also include data 316 that can be retrieved, manipulated, or stored by the processors 310. The memory 312 can be a type of transitory or non-transitory computer readable medium capable of storing information accessible by the processors 310, such as volatile and non-volatile memory. The processors 310 can include one or more central processing units (CPUs), graphic processing units (GPUs), field-programmable gate arrays (FPGAs), and/or application-specific integrated circuits (ASICs), such as tensor processing units (TPUs).

The instructions 314 can include one or more instructions that, when executed by the processors 310, cause the one or more processors 310 to perform actions defined by the instructions 314. The instructions 314 can be stored in object code format for direct processing by the processors 310, or in other formats including interpretable scripts or collections of independent source code modules that are interpreted on demand or compiled in advance. The instructions 314 can include instructions for implementing a token aggregation system 318, which can correspond to the token aggregation system 200 as depicted in FIG. 2. The token aggregation system 318 can be executed using the processors 310, and/or using other processors remotely located from the server computing device 302.

The data 316 can be retrieved, stored, or modified by the processors 310 in accordance with the instructions 314. The data 316 can be stored in computer registers, in a relational or non-relational database as a table having a plurality of different fields and records, or as JSON, YAML, proto, or XML documents. The data 316 can also be formatted in a computer-readable format such as, but not limited to, binary values, ASCII, or Unicode. Moreover, the data 316 can include information sufficient to identify relevant information, such as numbers, descriptive text, proprietary codes, pointers, references to data stored in other memories, including other network locations, or information that is used by a function to calculate relevant data.

The client computing device 304 can also be configured similarly to the server computing device 302, with one or more processors 320, memory 322, instructions 324, and data 326. The client computing device 304 can also include a user input 328 and a user output 330. The user input 328 can include any appropriate mechanism or technique for receiving input from a user, such as keyboard, mouse, mechanical actuators, soft actuators, touchscreens, microphones, and sensors.

The server computing device 302 can be configured to transmit data to the client computing device 304, and the client computing device 304 can be configured to display at least a portion of the received data on a display implemented as part of the user output 330. The user output 330 can also be used for displaying an interface between the client computing device 304 and the server computing device 302. The user output 330 can alternatively or additionally include one or more speakers, transducers or other audio outputs, a haptic interface or other tactile feedback that provides non-visual and non-audible information to the platform user of the client computing device 304.

Although FIG. 3 illustrates the processors 310, 320 and the memories 312, 322 as being within the respective computing devices 302, 304, components described herein can include multiple processors and memories that can operate in different physical locations and not within the same computing device. For example, some of the instructions 314, 324 and the data 316, 326 can be stored on a removable SD card and others within a read-only computer chip. Some or all of the instructions 314, 324 and data 316, 326 can be stored in a location physically remote from, yet still accessible by, the processors 310, 320. Similarly, the processors 310, 320 can include a collection of processors that can perform concurrent and/or sequential operation. The computing devices 302, 304 can each include one or more internal clocks providing timing information, which can be used for time measurement for operations and programs run by the computing devices 302, 304.

The server computing device 302 can be connected over the network 308 to a data center 332 housing any number of hardware accelerators 334. The data center 332 can be one of multiple data centers or other facilities in which various types of computing devices, such as hardware accelerators, are located. Computing resources housed in the data center 332 can be specified for deploying models, such as for token aggregation, as described herein.

The server computing device 302 can be configured to receive requests to process data from the client computing device 304 on computing resources in the data center 332.

For example, the environment 300 can be part of a computing platform configured to provide a variety of services to users, through various user interfaces and/or application programming interfaces (APIs) exposing the platform services. As an example, the variety of services can include aggregating model outputs and determining contribution amounts of the model outputs in the aggregated output on a token-by-token basis. The client computing device 304 can transmit input data as part of a query for a task to generate an aggregated output and contribution amounts for a particular task, such as generating digital content for display in a web space. The token aggregation system 318 can receive the input data, and in response, generate output data including a response to the query including the aggregated output and contribution amounts.

The server computing device 302 can maintain a variety of models in accordance with different constraints available at the data center 332. For example, the server computing device 302 can maintain different families for deploying models on various types of TPUs and/or GPUs housed in the data center 332 or otherwise available for processing.

Figure 4:
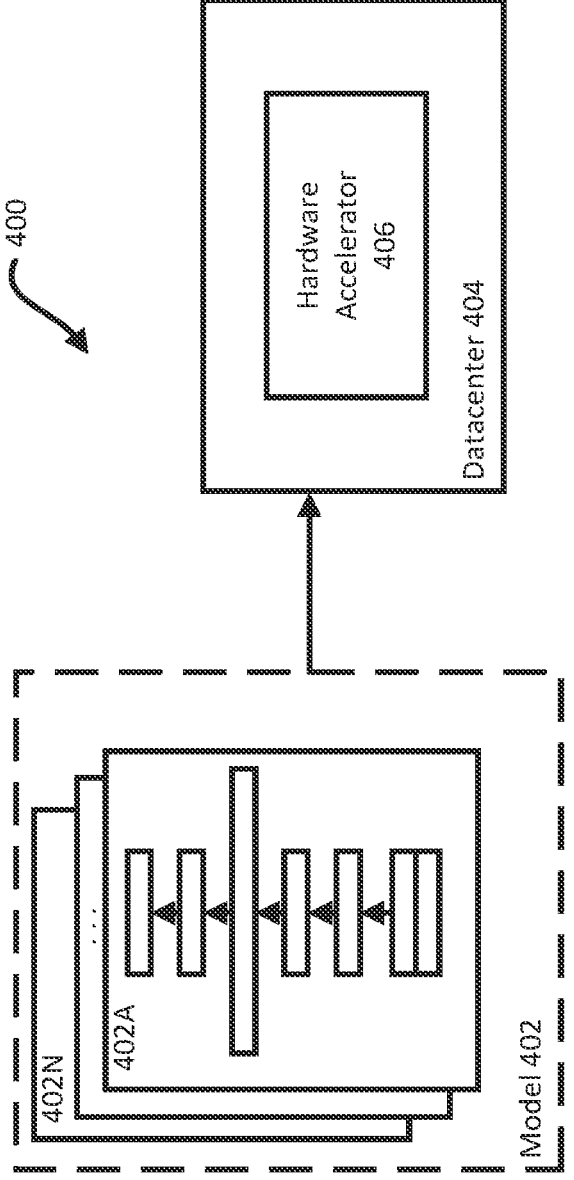
FIG. 4 depicts a block diagram of one or more machine learning model architectures according to aspects of the disclosure.

FIG. 4 depicts a block diagram 400 illustrating one or more machine learning model 402 architectures, more specifically 402A-N for each architecture, for deployment in a datacenter 404 housing a hardware accelerator 406 on which the deployed machine learning models 402 will execute, such as for the variety of services as described herein. The hardware accelerator 406 can be any type of processor, such as a CPU, GPU, FPGA, or ASIC such as a TPU.

An architecture of a machine learning model 402 can refer to characteristics defining the model, such as characteristics of layers for the model, how the layers process input, or how the layers interact with one another. The architecture of the machine learning model 402 can also define types of operations performed within each layer. One or more machine learning model 402 architectures can be generated that can output results, such as for aggregating model outputs and determining contribution amounts of the model outputs in the aggregated output on a token-by-token basis. Example model architectures can correspond to generative models, such as language models, foundation models, and/or graphical models.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated.

As another example, with respect to reinforcement learning, situations encountered by an agent, e.g., a model, a computing device, a system, a robot, etc., are mapped to actions taken by the agent in those situations to maximize the reward or value of its actions. The agent can interact with an environment through its actions. At any given time or point at which the agent is able to act, the environment can be represented as a state. The state can include any information or features about the environment that can be known by the agent. The value of a state is a measure of the total amount of reward the agent can receive from the current state and future states accessible from the current state. A value function can be defined or estimated for calculating, predicting, or estimating the value of a state. Techniques for training a machine learning model via reinforcement learning can focus on estimating or learning value functions to accurately predict value across different states of an environment.

The agent applies a policy to determine an action to take given the state of the environment. The policy can be stochastic, deterministic, or a mixture of the two. The agent can be provided a reward signal or value in response to performing the action, which can be positive, negative, or neutral. The action taken by the agent can advance the environment to a new state with an objective being to maximize the value of a state brought upon by the agent performing an action. Example reinforcement learning techniques include multi-armed bandits, Markov decision processes, Monte Carlo methods, policy gradient methods, and/or other approximate solution methods. Other approaches in reinforcement learning may not rely on estimating value functions.

The model or policy can be modified or updated until stopping criteria are met, such as a number of iterations for training, a maximum period of time, a convergence of estimated rewards or value between actions, or when a minimum value threshold is met.

Referring back to FIG. 3, the devices 302, 304 and the data center 332 can be capable of direct and indirect communication over the network 308. For example, using a network socket, the client computing device 304 can connect to a service operating in the data center 332 through an Internet protocol. The devices 302, 304 can set up listening sockets that may accept an initiating connection for sending and receiving information. The network 308 can include various configurations and protocols including the Internet, World Wide Web, intranets, virtual private networks, wide area networks, local networks, and private networks using communication protocols proprietary to one or more companies. The network 308 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 308, in addition or alternatively, can also support wired connections between the devices 302, 304 and the data center 332, including over various types of Ethernet connection.

Although a single server computing device 302, client computing device 304, and data center 332 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, or any combination thereof.

Figure 5:
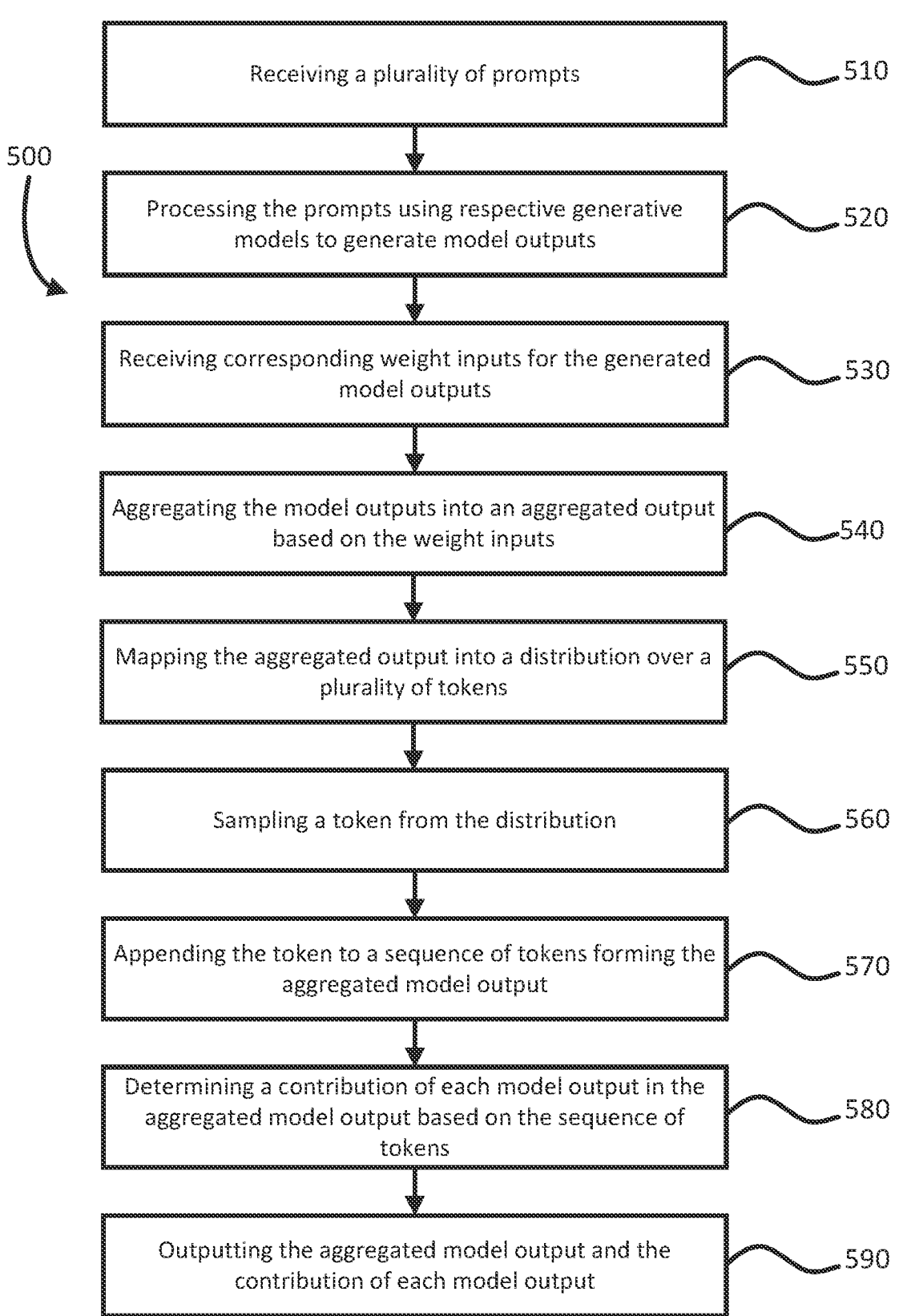
FIG. 5 depicts a flow diagram of an example process for aggregating generative model outputs according to aspects of the disclosure.

FIG. 5 depicts a flow diagram of an example process 500 for aggregating generative model outputs on a token-by-token basis. The example process 500 can be performed on a system of one or more processors in one or more locations, such as the token aggregation system 200 as depicted in FIG. 2.

As shown in block 510, the token aggregation system 200 receives a plurality of a prompts. The prompts can include instructions for respective generative models to generate outputs and weights for aggregation. Alternatively, or additionally, the prompts can include instructions for respective generative models to generate outputs and the prompts can further include the weights for aggregation. For example, the prompts can include instructions for respective large language models to generate digital content for display on a web space.

As shown in block 520, the token aggregation system 200 processes the prompts using the respective generative models to generate model outputs. The respective generative models can generate vectors representing the model outputs.

As shown in block 530, the token aggregation system 200 receives corresponding weight inputs for the generated model outputs. The weight inputs can be received as part of the prompts or can be generated by the respective generative models. For example, the prompts can further include respective bids to have the generated digital content displayed on the web space.

As shown in block 540, the token aggregation system 200 aggregates the model outputs into an aggregated output based on the weight inputs. The token aggregation system 200 can aggregate the plurality of model outputs using linear aggregation to aggregate a plurality of vectors.

As shown in block 550, the token aggregation system 200 maps the aggregated output into a distribution over a plurality of tokens. The token aggregation system 200 can map the aggregated output based on one or more decoding hyperparameters, such as greedy searching, top-K sampling, top-P sampling, and/or beam searching.

As shown in block 560, the token aggregation system 200 samples a token from the distribution. As shown in block 570, the token aggregation system 200 appends the token to a sequence of tokens forming the aggregated model output. The token aggregation system 200 can iteratively sample and append tokens to form the aggregated model output.

As shown in block 580, the token aggregation system 200 determines a contribution of each model output in the aggregated model output based on the sequence of tokens. The token aggregation system 200 determines the contribution based on threshold weight inputs that shift the contribution from a less preferred to a more preferred token. The shift can be based on partial orders over the distribution.

As shown in block 590, the token aggregation system 200 outputs the aggregated model output and the contribution of each model output. For example, the token aggregation system 200 can output a combined digital content for display on a web page and adjusted payment amounts compared to the bids based on how much each individual digital content is included within the combined digital content.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for aggregating generative model outputs on a token-by-token basis, comprising:
   receiving, by one or more processors, a plurality of model outputs and corresponding weight inputs;
   aggregating, by the one or more processors, the plurality of model outputs into an aggregated output based on the weight inputs;
   mapping, by the one or more processors, the aggregated output into a distribution over a plurality of tokens;
   sampling, by the one or more processors, a token from the distribution;
   appending, by the one or more processors, the token to a sequence of tokens that form an aggregated model output;
   computing, by the one or more processors, a contribution of each model output in the aggregated model output based on the sequence of tokens that form the aggregated model output; and
   outputting, by the one or more processors, the aggregated model output and the contribution of each model output in the aggregated model output.

2. The method of claim 1, further comprising iteratively performing the sampling and appending to form the aggregated model output.

3. The method of claim 1, further comprising:
   receiving, by the one or more processors, a plurality of prompts; and
   processing, by the one or more processors, the prompts using respective generative models to generate the model outputs.

4. The method of claim 1, wherein the generative models comprise at least one of large language models, large foundation models, or large graphical models.

5. The method of claim 1, wherein the plurality of model outputs comprises a plurality of vectors.

6. The method of claim 1, wherein aggregating the plurality of model outputs further comprises performing linear aggregation.

7. The method of claim 1, wherein mapping the aggregated output into a distribution is according to one or more decoding hyperparameters.

8. The method of claim 1, wherein the contribution is based on threshold weight inputs that shift the contribution from a less preferred to a more preferred token.

9. A system comprising:
   one or more processors; and
   one or more storage devices coupled to the one or more processors and storing instructions that, when executed by the one or more processors, cause the one or more processors to perform operations for aggregating generative model outputs on a token-by-token basis, the operations comprising:
   receiving a plurality of model outputs and corresponding weight inputs;
   aggregating the plurality of model outputs into an aggregated output based on the weight inputs;
   mapping the aggregated output into a distribution over a plurality of tokens;
   sampling a token from the distribution;

appending the token to a sequence of tokens that form an aggregated model output;

computing a contribution of each model output in the aggregated model output based on the sequence of tokens that form the aggregated model output; and outputting the aggregated model output and the contribution of each model output in the aggregated model output.

10. The system of claim 9, wherein the operations further comprise iteratively performing the sampling and appending to form the aggregated model output.

11. The system of claim 9, wherein the operations further comprise:

receiving a plurality of prompts; and processing the prompts using respective generative models to generate the model outputs.

12. The system of claim 9, wherein the plurality of model outputs comprises a plurality of vectors.

13. The system of claim 9, wherein aggregating the plurality of model outputs further comprises performing linear aggregation.

14. The system of claim 9, wherein mapping the aggregated output into a distribution is according to one or more decoding hyperparameters.

15. The system of claim 9, wherein the contribution is based on threshold weight inputs that shift the contribution from a less preferred to a more preferred token.

16. A non-transitory computer readable medium for storing instructions that, when executed by the one or more processors, cause the one or more processors to perform operations for aggregating generative model outputs on a token-by-token basis, the operations comprising:

receiving a plurality of model outputs and corresponding weight inputs;

aggregating the plurality of model outputs into an aggregated output based on the weight inputs;

mapping the aggregated output into a distribution over a plurality of tokens;

sampling a token from the distribution;

appending the token to a sequence of tokens that form an aggregated model output;

computing a contribution of each model output in the aggregated model output based on the sequence of tokens that form the aggregated model output; and outputting the aggregated model output and the contribution of each model output in the aggregated model output.

17. The non-transitory computer readable medium of claim 16, wherein the operations further comprise iteratively performing the sampling and appending to form the aggregated model output.

18. The non-transitory computer readable medium of claim 16, wherein aggregating the plurality of model outputs further comprises performing linear aggregation.

19. The non-transitory computer readable medium of claim 16, wherein mapping the aggregated output into a distribution is according to one or more decoding hyperparameters.

20. The non-transitory computer readable medium of claim 16, wherein the contribution is based on threshold weight inputs that shift the contribution from a less preferred to a more preferred token.

* * * * *